Aug 5, 1941.     G. W. BLAIR ET AL     2,251,318
CUSHIONING FACILITY FOR SEATS AND THE LIKE
Filed Dec. 17, 1937     2 Sheets-Sheet 2

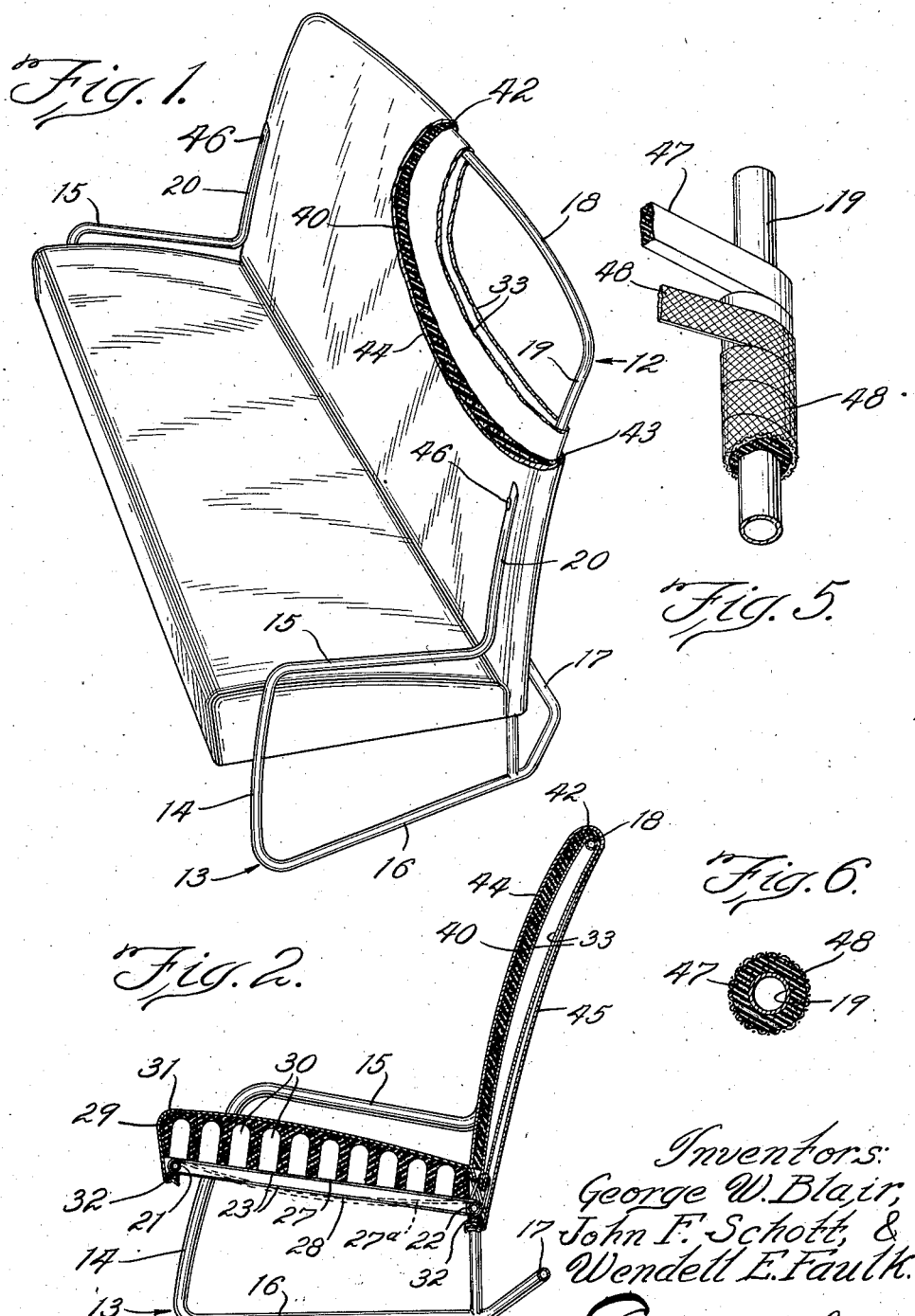

Inventors:
George W. Blair,
John F. Schott, &
Wendell E. Fauth.
By: Eugene M. Giles Atty.

Patented Aug. 5, 1941

2,251,318

UNITED STATES PATENT OFFICE 2,251,318

CUSHIONING FACILITY FOR SEATS AND THE LIKE

George W. Blair, John F. Schott, and Wendell E. Faulk, Mishawaka, Ind., assignors to Mishawaka Rubber and Woolen Manufacturing Company, Mishawaka, Ind., a corporation of Indiana Application December 17, 1937, Serial No. 180,274

15 Claims. (Cl. 155—179)

This invention relates to seat structures and the like and has reference more particularly to cushioning facilities thereof.

In recent years it has been found that a spongy type of rubber is far superior to materials and structures previously employed for cushioning purposes in seats, mattresses and the like as it has a peculiar soft yielding characteristic that insures greater ease and comfort. Moreover in vehicles, such cushions have other advantages as the spongy rubber absorbs vibrations which other cushioning materials and structures transmit to a person thereon and the rubber also dampens rebound which is a particularly objectionable characteristic of cushion structures in which springs are employed.

Rubber cushions, however, have generally been made of considerable depth or thickness to obtain the requisite yieldability, in this respect corresponding to the most effective spring cushions which on account of the type of spring structures employed, as for example in automobile cushions, require considerable depth, although in many places where seating capacity is important, as for example in theatres and the like, the thickness of the cushion structure and especially that of the seat backs, materially affects the seating capacity. Obviously the cushion depth or thickness is of especial importance in automobiles where economy of space is a primary objective in order to provide the greatest amount of available room for the car occupants in a car of a given size or price range, although it is essential that such economy of space must not be obtained by a sacrifice of the riding comfort afforded by cushions of the thickness or depth heretofore employed, and it will be readily appreciated that a decrease in the thickness of the seat backs in automobiles materially affects the available room in the car and that a decrease in the thickness of the seat proper of the automobile seat increases the available space thereunder for storage or other purposes.

Solid rubber under tension has cushioning advantages similar to that of the spongy type of rubber, namely soft and easy yieldability and capability of absorbing vibrations and dampening rebound, and we have found that by combining solid rubber under tension in proper cooperative relation with the spongy type of rubber a cushioning structure of greatly decreased depth or thickness may be produced which has the desirable cushioning properties and capability of absorbing vibrations and dampening rebound that has heretofore been obtainable only with spongy rubber cushions of a much greater depth or thickness. Aside from the economy of space that results, this has the further advantage that much less rubber is required and there is a substantial saving in cost and weight.

Moreover, we have also found that by combining the solid rubber with a suitable fabric, the cushioning advantages thereof are greatly increased as the hysteresis of the combined rubber and fabric is very high and this causes slower action with correspondingly greater ease and comfort and elimination of rebound. Also the use of the fabric insures greater strength, minimizes the amount of rubber and the deterioration thereof through ageing.

The principal objects of this invention are to provide improved cushioning facilities for automobile seats as well as for other cushioned structures such as chairs, lounges, beds and the like; to minimize the space required for cushioning facilities for such purposes; to obtain in the minimized space cushioning properties and the ease and comfort heretofore necessitating cushion structures of much greater depth or thickness; to provide facilities which are particularly adaptable to rubber cushioning and minimize the amount of rubber required; to provide an improved cushion backing for cushioning material; and to simplify and facilitate the manufacture and reduce the cost of cushion structures, these and other objects being accomplished as will appear from the following description of the invention and from the illustrative embodiment thereof shown in the accompanying drawings in which, Fig. 1 is a view in perspective, with parts broken away, of an automobile seat constructed in accordance with this invention;

Fig. 2 is a vertical sectional view of the seat structure of Fig. 1;

Fig. 5 shows a fragmentary portion of the seat back frame with a cushion covering that may be employed thereon; and Fig. 6 is a cross section of the modification shown in Fig. 5.

Figures 3, 4:
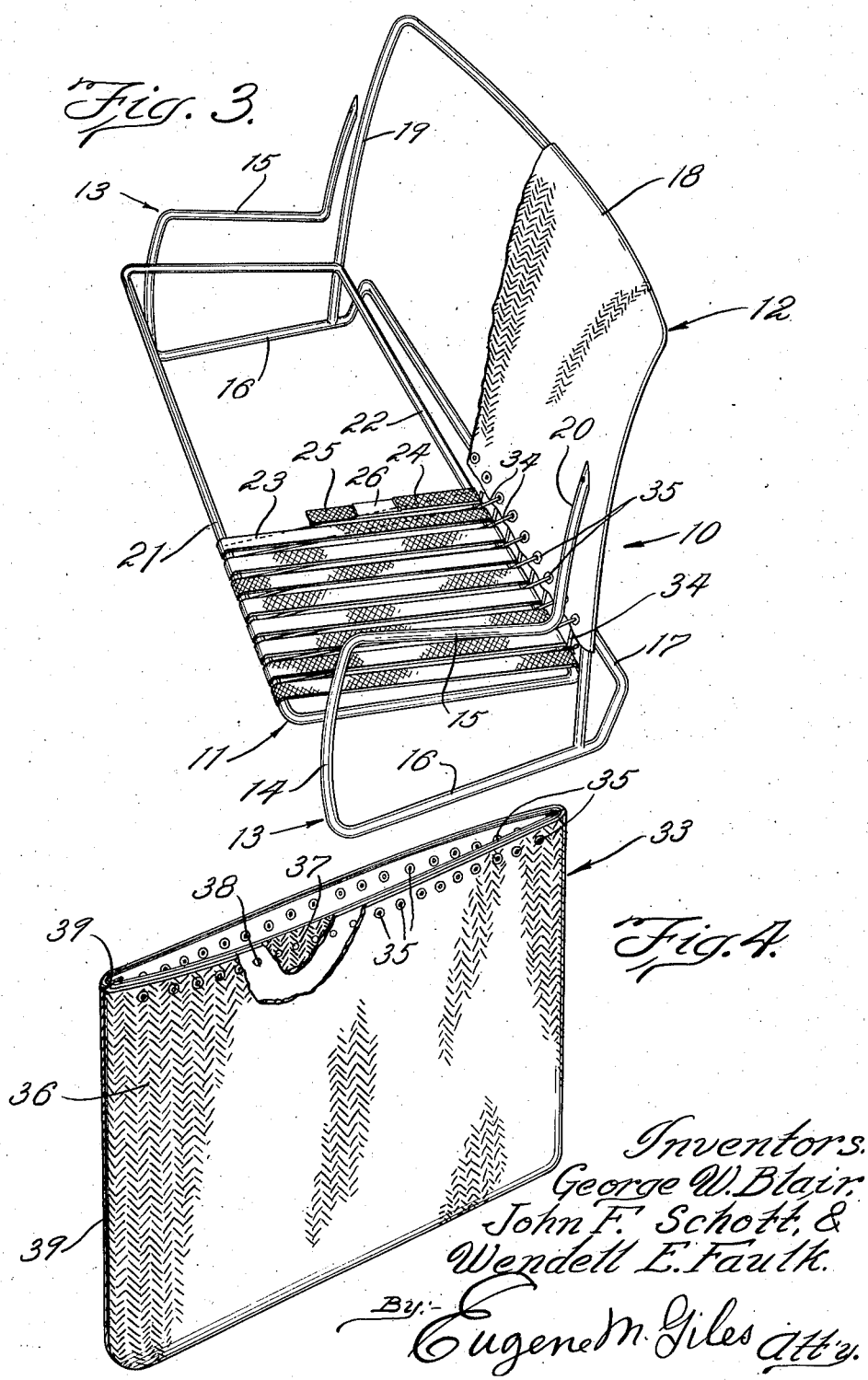
Fig. 3 is a perspective view of the seat frame showing certain parts assembled thereon.
Fig. 4 is a perspective view of the envelope used in the seat back.

Referring to the drawings in which is shown a structure suitable for use as the front seat of an automobile, although it is to be understood that the invention is applicable to rear automobile seats as well as seats and cushioned structures other than automobile seats, the reference numeral 10 indicates as a whole a frame comprising a seat bottom section 11, a seat back section 12 and two end sections 13, all preferably made of tubing and welded or otherwise secured together into a seat frame unit. The end sections 13 are bent in the form shown with front post portions 14 and upper and lower reaches 15 and 16, the latter of which rest on the floor and are connected at the rear by a raised portion 17 which serves as a foot rest for the rear seat occupants, while the seat back section 12 comprises a top rail 18 with downturned depending posts 19 at the ends which are secured at their lower ends to the lower reaches 16 of the respective end sections 13 near the rear ends of these reaches, said posts being preferably slightly curved longitudinally to give to the seat back a contour to afford a comfortable seat back. The upper reaches 15 of the end sections have upturned rear ends 20 spaced forwardly of and extending part way up the respective posts 19 and adapted to be secured thereto through the cushion covering after the latter has been assembled on the seat back frame.

The seat bottom section 11 is of elongated rectangular form with front and rear lengths 21 and 22 and is secured at its ends to the posts 14 of the end sections 13 and to the posts 19 of the seat back section 12 to support the seat at the desired elevation and this seat bottom section is provided with a deck structure upon which the seat bottom cushion is supported.

This deck structure is of elastic material composed of rubber, preferably combined with an extensible fabric, and is stretched under tension on the frame 11 to which it may be secured in any convenient manner, the proper proportioning of the elastic material to the load and the tension at which it is stretched on the frame being important as it must be arranged to resiliently support the cushion with substantial resistance against depressive displacement and yet the tension at which the elastic material is stretched must be such that there is sufficient further stretch to permit the deck to yield properly to the load conditions to which it is subjected without exceeding the elastic limit and taking a permanent set which would permit sagging and impair its cushioning effect. The fabric, while extensible, should be adapted, when combined with the rubber, to prevent stretching of the deck beyond the extent necessary for proper cushioning and it is particularly important that the combined rubber and fabric have a high hysteresis as this has a slowing down or retarding effect on the stretching and retraction of the material, absorbs vibrations and shocks and insures a deck action that affords maximum ease and comfort.

A particularly simple and effective deck structure of this character may be provided by employing a tape 23 of rubber and a fabric that is longitudinally extensible and winding this composite rubber and fabric tape spirally on and between the front and rear lengths 21 and 22 of the seat bottom frame section as shown in Fig. 3, a tape that we have found particularly suitable for the purpose being about one and one-half inches wide and made of two layers 24 and 25 of a strong bias cut fabric, such as canvas or duck, which are gum coated, preferably on both sides, and secured to the opposite sides of a thin layer 26 of pure gum. When this tape is properly stretched under tension around the seat bottom section 11 and secured at the ends it has sufficient stretchiness, on account of the rubber and the bias cutting of the fabric, to provide a yielding deck for the seat cushion and it is to be noted that by winding the tape around the tubes 21 and 22 of the frame 11, there are upper and lower lengths of tape as indicated respectively at 27 and 28 in Fig. 2, the latter lengths 28 of which supplement the upper lengths and come into action to yieldingly resist further depression of the upper tapes 27 when these upper tapes have been pressed down to the level of and come in contact with the lower tapes 28 as indicated by the dotted lines at 27ª in Fig. 2. A single layer of the tape may, of course, be employed instead of the winding with its double layer arrangement and the single layer may be secured to the frame in any convenient manner. In either case, it will be apparent that the tape structure has the advantage that the depressibility of the deck may be easily varied as a whole or at selected places by merely varying the spacing of the tape, or overlapping same if necessary, to obtain the desired yieldability or supporting strength.

Other forms of rubber and fabric decks may be employed as well as other kinds of fabric, such as a knit fabric or even fibre strands merely embedded in the rubber, as for example in crisscross relation similar to the arrangement of the warp and weft threads of the bias cut fabric, as such strands, when embedded in and secured together by the rubber serve, like the crossed cord layers of an automobile tire, to provide a fabric structure of great strength.

Preferably a rubber cushion body is used upon the deck thus formed, such rubber cushion body, which is indicated at 29, being of a spongy type rubber which may be molded to form and has closely adjoining cavities 30 throughout the under surface and this rubber body is secured to the frame 11 by the covering fabric 31 which is drawn down along the sides and ends of the rubber cushion 29 and fastened to tacking strips 32 which are secured to the under side of the tubing of the frame 11. The frame 11 and deck 23, instead of being made up as a part of the seat frame, may, if desired, be attached to the cushion body to form a composite unit of marginal frame, rubber and fabric deck and cushion body in which case the seat frame is suitably constructed for removable mounting of the composite unit thereon.

The back of the seat may also be of a tape construction similar to that of the seat bottom and the tape may extend across the back from side to side or up and down or may be woven in and out to make a fabric type of structure and the tape may be wound around the frame to provide two layers as in the illustrated seat structure or secured to the frame in a manner to form a single layer. Instead of the tape an envelope may be employed as indicated at 33 in Fig. 4 which is slipped downwardly over the seat back section 12 and may be drawn taut thereon by a lacing 34 engaged around the rear rail 22 of the seat bottom frame and through eyelets 35 along the lower edge of the envelope 33. This envelope is made of rubber and a stretchy fabric such as knitted fabric, cotton net or square woven fabric assembled on the bias, two layers 36 and 37 of fabric preferably being employed and secured to the inner and outer sides respectively of a rubber layer 38, and it will be readily understood that when such envelope is laced under tension to the rear rail 22 of the seat frame 11, it will pull in laterally and thus be stretched tightly between the side posts 19 of the seat back as well as between the top rail 18 and the lacing 34 thereby affording a yielding back surface for the seat back with supplementary rear layer to resist further compression of the front layer if the latter is pressed backward against the said rear layer.

The back envelope 33 may be made as indicated in Fig. 4 by doubling over a laminated sheet of the rubber 38 and fabrics 36 and 37 and securing same along the edges as at 39 in the envelope form or the envelope may be molded in the required form. Moreover, a single layer of the rubber and fabric may be employed instead of the envelope and secured to the frame in any convenient manner or the envelope may be made with only the front layer of laminated rubber 38 and fabrics 36 and 37 and may have a back layer consisting merely of a duck or canvas of proper strength.

After the envelope 33 has been secured in place, a pad 40 of sponge rubber is secured on the front thereof and provided with tapered margins which are curled over the top rail 18 and side posts 19 as shown at 42 and 43 respectively, and a cover fabric 44 is applied over this rubber pad 40 and may have a back portion 45 which, together with the front covering 44 is drawn down and secured to the rear tacking strip 32 on the frame 11. After the seat back is completed, the extensions 20 of the end frames 13 may be fastened through the cushion to the posts 19 as indicated at 46 in Fig. 1.

In order to fasten the lower edge of the front covering 44 as well as the rear edge of the seat covering 31 to the tacking strip 32 on the rear rail 22, these edges may be split to straddle the lacings 34 or tapes may be attached to the said edges at suitable intervals to extend between the lacings and fasten to the tacking strip or any other convenient arrangement may be employed to secure said edges in place.

In order to provide cushioned surfaces for supporting the back envelope 33 the side posts 19 as well as the top rail 18 may be enclosed in a rubber covering which may be in the form of a strip 47 preferably of sponge rubber wound thereon as indicated in Fig. 5 and this rubber winding is preferably covered by a layer 48 of fabric which may be applied by winding or otherwise.

Thus both the seat bottom and seat back are composed of fabric reinforced rubber stretched under tension so as to have ample strength with the desirable soft easy cushioning and vibration absorbing and rebound dampening characteristics of rubber and they are also of double deck form with a supplemental layer backing up the layer against which the cushion or pad is applied and by reason of the cushioning effect of and the ease and comfort contributed by these fabric reinforced rubber surfaces or decks, cushions or pads 29 and 40 of relatively little depth or thickness may be employed while at the same time the cushion structure has the same comfortable cushioning effect and capability of absorbing vibrations and dampening rebound as relatively thick cushions of spongy rubber. With these fabric reinforced rubber surfaces, it is even possible to make a very comfortable seat without employing any cushion or pad thereon.

While we have shown and described our invention in a preferred form, we are aware that various changes and modifications may be made therein without departing from the principles of our invention, the scope of which is to be determined by the appended claims in which the term "deck," unless otherwise limited in the claim, is intended to include the supporting surface whether arranged in substantially horizontal position, as for example for seat bottom support, or in upright position as for the seat back.

We claim as our invention:

1. In a cushion structure, the combination of a supporting frame and a depressible deck stretched under tension on said frame, said deck comprising rubber and fabric intimately combined in a manner to impart a high hysteresis to the combined rubber and fabric deck.

2. In a cushion structure, the combination of a supporting frame and a depressible deck stretched under tension on said frame, said deck comprising rubber and fabric intimately combined in a manner to impart a high hysteresis to the combined rubber and fabric, said fabric having the threads thereof arranged obliquely to the direction of tension stretch.

3. In a cushion structure, the combination of a supporting frame and a depressible deck stretched under tension on said frame, said deck comprising rubber and fabric intimately combined in a manner to impart a high hysteresis to the combined rubber and fabric, said fabric being of a loose stretchy texture.

4. In a cushion structure, the combination of a supporting frame, a supporting deck of adhesively combined fabric and rubber stretched under tension on said frame, and a cushion padding supported on said deck.

5. In a cushion structure, the combination of a supporting frame, a supporting deck stretched under tension on said frame and comprising a fabric faced layer of rubber, and a cushion padding supported on said deck, said fabric facing and rubber being adhesively bonded together.

6. In a cushion structure, the combination of a supporting frame, a stretchy deck of laminated rubber and bias cut tape adhesively combined and secured under tension on said frame, and a cushion padding supported on said deck.

7. In a cushion structure, the combination of a supporting frame, a stretchy double decked cushion support mounted under tension on said frame, and a cushion padding on said support.

8. In a cushion structure, the combination of a supporting frame, a stretchy deck of fabric reinforced rubber mounted under tension on said frame, a cushion padding supported on said deck, and auxiliary deck supporting means stretched under tension in adjoining spaced relation under said deck.

9. In a cushion structure, the combination of a marginal supporting frame, said frame having at each side thereof a stretchy deck of intimately combined fabric and rubber stretched under tension, and a cushion padding on one of said decks and spaced from the other deck.

10. In a cushion structure, the combination of an envelope of fabric reinforced rubber, a marginal frame within and on which said envelope is stretched under tension, and a cushion padding on the exterior of said envelope at one side of said frame.

11. In a cushion structure, the combination of a marginal frame having laterally spaced members, a fabric reinforced rubber strip wound on said frame and extending between said members, and a cushion padding mounted on the wound rubber strip at one side of said frame.

12. In a cushion structure, the combination of a substantially U-shaped frame, a bag-like covering of fabric reinforced rubber on the U-shaped frame, and means along the mouth of the bag-like covering by which said covering is stretched under tension on the U-shaped frame.

13. In a cushion structure, the combination of a marginal frame, with a spongy rubber covering thereon, a supporting deck of fabric reinforced rubber stretched under tension on the rubber covered marginal frame, and a cushion padding on said deck.

14. In a cushion structure, the combination of a frame having a supporting deck comprising a sheet of solid rubber under tension, and having a sheet of fabric intimately combined therewith, and a cushion padding of relaxed spongy rubber on said deck.

15. The method of making a depressible cushioning deck of the class described which comprises combining a stretchy fabric with rubber to form a composite rubber and fabric webbing with high hysteresis properties, and stretching the webbing on a frame under tension substantially below the elastic limit of the rubber and fabric webbing with the weave of the fabric in a prearranged extensibly responsive relation to the tension strains.

GEORGE W. BLAIR.
JOHN F. SCHOTT.
WENDELL E. FAULK.